United States Patent
Ebsen et al.

(10) Patent No.: US 12,487,213 B2
(45) Date of Patent: Dec. 2, 2025

(54) MOUNTING DEVICE FOR MOUNTING A SAMPLE SEPARATION UNIT

(71) Applicant: Agilent Technologies, Inc., Santa Clara, CA (US)

(72) Inventors: Johnny Ebsen, Pfinztal (DE); Anneke Muehlebach, Waldbronn (DE); Dirk Arheidt, Waldbronn (DE); Cathrin Sohns, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 279 days.

(21) Appl. No.: 18/265,932

(22) PCT Filed: Dec. 13, 2021

(86) PCT No.: PCT/IB2021/061627
§ 371 (c)(1),
(2) Date: Jun. 7, 2023

(87) PCT Pub. No.: WO2022/130166
PCT Pub. Date: Jun. 23, 2022

(65) Prior Publication Data
US 2024/0036015 A1   Feb. 1, 2024

(30) Foreign Application Priority Data

Dec. 14, 2020 (DE) .................. 102020133422.2

(51) Int. Cl.
*G01N 30/60* (2006.01)
*B01D 15/22* (2006.01)
(Continued)

(52) U.S. Cl.
CPC ......... *G01N 30/6047* (2013.01); *B01D 15/22* (2013.01); *G01N 30/16* (2013.01); *G01N 2030/027* (2013.01)

(58) Field of Classification Search
CPC .............. G01N 30/6047; G01N 30/16; G01N 2030/027; B01D 15/22
See application file for complete search history.

(56) References Cited

U.S. PATENT DOCUMENTS 4,044,593 A    8/1977  Haruki et al.
4,089,207 A *  5/1978  Patton ................ G01N 30/6091
                                                219/535
(Continued)

FOREIGN PATENT DOCUMENTS

DE    112016006724 T5    12/2018
EP       0309596 B1       3/1993
(Continued)

OTHER PUBLICATIONS

PCT Notification of Transmittal of The International Search Report & Written Opinion mailed on Mar. 3, 2022 for Application No. PCT/IB2021/061627; 15 Pages.

*Primary Examiner* — David J Bolduc (57) ABSTRACT

An installation device is for installing a sample separating device for separating a liquid sample in a sample separating tool. The installation device includes a first fluid connection for fluidically connecting to a first fluid connection point of the sample separating device, and an actuation device that can be actuated by a user for converting between an access position and a fluid coupling position. The access position makes the sample separating device accessible to the user, and the fluid coupling position fluidically couples the sample separating device. The installation device also includes a fluid coupling mechanism, which forms a force-loaded fluidic connection between the first fluid connection and the first fluid connection point when the sample separating device is converted into the fluid coupling position by the
(Continued)

actuation device. The sample separating device may, for example, be configured for chromatography.

18 Claims, 2 Drawing Sheets

(51) Int. Cl.
*G01N 30/16* (2006.01)
*G01N 30/02* (2006.01)

(56) References Cited

U.S. PATENT DOCUMENTS

| | | | | |
|---|---|---|---|---|
| 4,394,263 | A * | 7/1983 | Dosch | G01N 30/40 |
| | | | | 96/104 |
| 4,451,365 | A * | 5/1984 | Sattler | G01N 30/6047 |
| | | | | 96/106 |
| 4,580,036 | A | 4/1986 | Hunt et al. | |
| 4,711,764 | A * | 12/1987 | Good | G01N 30/22 |
| | | | | 422/65 |
| 5,358,641 | A * | 10/1994 | Sanford | G01N 30/32 |
| | | | | 422/65 |
| 6,162,362 | A * | 12/2000 | Ma | B01D 15/22 |
| | | | | 210/656 |
| 6,641,783 | B1 * | 11/2003 | Pidgeon | G01N 30/7266 |
| | | | | 210/659 |
| 8,840,784 | B2 | 9/2014 | Prentice et al. | |
| 9,188,573 | B2 | 11/2015 | Liu et al. | |
| 2006/0110290 | A1 * | 5/2006 | Cortelazzo | G01N 1/31 |
| | | | | 422/65 |
| 2007/0084982 | A1 | 4/2007 | Martone et al. | |
| 2008/0135484 | A1 * | 6/2008 | Hammer | G01N 30/92 |
| | | | | 210/198.3 |
| 2009/0014373 | A1 * | 1/2009 | Choikhet | G01N 30/6047 |
| | | | | 96/106 |
| 2009/0246877 | A1 * | 10/2009 | Moran, Jr. | B01L 3/5021 |
| | | | | 422/68.1 |
| 2010/0154207 | A1 * | 6/2010 | Ford | G01N 30/6004 |
| | | | | 29/700 |
| 2010/0163490 | A1 * | 7/2010 | Lasalle | B01D 15/20 |
| | | | | 141/12 |
| 2011/0290731 | A1 * | 12/2011 | Ozbal | G01N 35/025 |
| | | | | 210/656 |
| 2014/0163920 | A1 * | 6/2014 | Jorgensen | B65B 5/06 |
| | | | | 422/547 |
| 2014/0231330 | A1 * | 8/2014 | Baumann | B01D 15/22 |
| | | | | 210/198.2 |
| 2015/0336027 | A1 * | 11/2015 | Eriksson | G01N 30/6047 |
| | | | | 29/428 |
| 2017/0343520 | A1 * | 11/2017 | Ortmann | G01N 30/04 |
| 2018/0209921 | A1 * | 7/2018 | Petrofsky | G21G 1/0005 |
| 2018/0284079 | A1 * | 10/2018 | Yasunaga | G01N 30/20 |
| 2019/0271670 | A1 * | 9/2019 | Kirby | G01N 30/02 |
| 2019/0317061 | A1 * | 10/2019 | Nakagawa | G01N 30/32 |
| 2019/0358561 | A1 * | 11/2019 | Cirou | B01D 15/14 |
| 2019/0374874 | A1 * | 12/2019 | Cirou | G01N 30/20 |
| 2020/0025727 | A1 * | 1/2020 | Hasegawa | G01N 30/6004 |
| 2020/0200718 | A1 * | 6/2020 | Devakumar | G01N 30/02 |
| 2020/0203138 | A1 * | 6/2020 | Shultz | G01N 35/1097 |
| 2020/0386725 | A1 * | 12/2020 | Ozbal | G01N 30/82 |
| 2021/0341437 | A1 * | 11/2021 | Leveille | G01N 30/6047 |
| 2022/0057012 | A1 * | 2/2022 | Dahlgren | F16K 11/08 |
| 2022/0236235 | A1 * | 7/2022 | Loraing | G01N 30/6047 |
| 2024/0393299 | A1 * | 11/2024 | Scanlon | G01N 30/6026 |

FOREIGN PATENT DOCUMENTS

| | | |
|---|---|---|
| GB | 2564603 A | 1/2019 |
| JP | H07239325 A | 9/1995 |
| JP | H10170489 A | 6/1998 |
| JP | H10239297 A | 9/1998 |
| JP | 3776446 B1 | 3/2006 |
| JP | 2007078436 A | 3/2007 |
| WO | 2019053848 A1 | 3/2019 |

* cited by examiner

MOUNTING DEVICE FOR MOUNTING A SAMPLE SEPARATION UNIT

RELATED APPLICATIONS

This application is the national stage under 35 U.S.C. 371 of International Application No. PCT/IB2021/061627, filed Dec. 13, 2021; which claims priority to German Application No. DE 10 2020 133 422.2, filed Dec. 14, 2020; the entire contents of each of which are incorporated by reference herein.

TECHNICAL FIELD

The present invention relates to a mounting device and a method for mounting a sample separation unit for separating a fluidic sample in a sample separation device, and to a sample separation device.

BACKGROUND

In a HPLC, typically a liquid (mobile phase) at a very precisely controlled flow rate (for example in a range of microliters to milliliters per minute) and at a high pressure (typically 20 to 1000 bar and more, currently up to 2000 bar), where the compressibility of the liquid is noticeable, is moved through a stationary phase (for example a chromatographic column), to separate single components of a sample liquid from each other, which is introduced in the mobile phase. For example, such a HPLC-system is known from EP 0,309,596 B1 of the same applicant, Agilent Technologies, Inc.

During a separation process, it may be required or desirable to bring the column to a desired temperature. For this purpose, the column is mounted in a column oven and is heated there. The mounting of a column in a column oven is frequently inconvenient for a user. During such a mounting, a user has to handle small and unwieldy components, such as capillaries and fittings, and has to couple them with the column. This constitutes a delicate activity which cannot be accomplished by a user without special expertise.

GB 2564603, JP 07239325 and JP 03776446 disclose conventional systems for mounting a separation column.

SUMMARY

It is an object to enable a rapid, error-robust and user-conveniently mounting of a sample separation unit in a sample separation device, and to obtain a precise separation result after the mounting of the sample separation unit.

According to an exemplary embodiment of the present invention, a mounting device for mounting a sample separation unit for separating a fluidic sample in a sample separation device is provided, wherein the mounting device comprises a first fluid port for fluidically connecting to a first fluid connection point of the sample separation unit (optionally a second fluid port for fluidically connecting to a second fluid connection point of the sample separation unit), an actuation unit which is actuatable by a user for transferring between an access position which renders the sample separation unit accessible for the user, and a fluid coupling position which fluidically couples the sample separation unit, and a fluid coupling mechanism which is configured for forming a force-loaded fluidic coupling between the first fluid port and the first fluid connection point (and optionally between the second fluid port and the second fluid connection point), when the sample separation unit is transferred in the fluid coupling position by the actuation unit.

According to another exemplary embodiment, a sample separation device for separating a fluidic sample which is in a mobile phase (for example in fractions) is provided, wherein the sample separation device comprises a fluid conveying unit for conveying the mobile phase and the fluidic sample, a sample separation unit for separating the fluidic sample which is in the mobile phase which is conveyed by the fluid conveying unit (for example in fractions), and a mounting device with the above described features, by which the sample separation unit is fluidically mounted in the sample separation device.

According to yet another exemplary embodiment, a method for mounting a sample separation unit for separating a fluidic sample in a sample separation device is provided, wherein the method comprises actuating, by a user, an actuation unit of a mounting device for transferring the sample separation unit from an access position which renders the sample separation unit accessible for the user, to a fluid coupling position which fluidically couples the sample separation unit in the sample separation device, and simultaneously forming a force-loaded fluidic coupling of the sample separation unit in the sample separation device by activating a fluid coupling mechanism by merely actuating the actuation unit for transferring the sample separation unit in the fluid coupling position.

In the context of the present application, the term "sample separation device" may in particular denote a device which is capable and configured to separate a fluidic sample (for example in different fractions). For example, the sample separation may be performed by a chromatography or an electrophoresis. For example, the sample separation device may be a liquid chromatography sample separation device.

In the context of the present application, the term "fluidic sample" in particular denotes a medium which comprises a fluid (in particular a liquid and/or a gas, optionally comprising solid particles) and which contains the substance to be analyzed (for example a biological sample, such as a protein solution, a pharmaceutical sample, etc.).

In the context of the present application, the term "mobile phase" in particular denotes a fluid (in particular a liquid and/or a gas, optionally comprising solid particles), which serves as a carrier medium for transporting the fluidic sample from a fluid drive to a sample separation unit. For example, the mobile phase may be a (for example organic and/or inorganic) solvent or a solvent composition (for example water and ethanol).

In the context of the present application, the term "sample separation unit" in particular denotes a component part which can be inserted in a sample separation device and, in the context of the operation of the sample separation device, alone or in cooperation with other component parts, causes a separation of a fluidic sample to different components. In particular, such a sample separation unit may be a chromatography separation column or a component part for an electrophoresis separation. For example, a chromatography separation column may comprise a container which is filled with a stationary phase, wherein the stationary phase may adsorb different components of the fluidic sample when the fluidic sample flows between an inlet and an outlet (i.e. between two fluid connection points). Moreover, the stationary phase may be configured to desorb and/or release the adsorbed components in fractions, in particular depending on a mobile phase which is flowing through the sample separation unit in form of a solvent composition.

In the context of this application, the term "actuation unit" in particular denotes an apparatus which is actuatable by a user by hand, which can be brought to different positions, for example by a mechanical action of the user. In particular, the configuration of the actuation unit may be such that it also causes the reception of a sample separation unit and its motion between different spatial positions/orientations in the mounting device, when a user actuates the actuation unit.

In the context of this application, the term "fluid port" in particular denotes a component part which is configured for fluidically connecting (and in particular in a fluid tight manner, further in particular in a high-pressure tight manner) with an inlet or an outlet of the sample separation unit. In particular, such a fluid port may be configured as a fitting.

In the context of this application, the term "fluid connection point" in particular denotes an inlet or an outlet of a sample separation unit. Such a fluid connection point may be configured for fluidically connecting to a fluid port of the mounting device.

In the context of this application, the term "access position" in particular denotes a defined operation position (and which is different from the fluid coupling position), in which a reception unit for receiving a sample separation unit or the like is accessible for a user, such that the user, in the access position, can insert a sample separation unit in the mounting device or can remove a sample separation unit from the mounting device which is mounted there. In the access position, it is possible that a sample separation unit which is received at the reception unit is not fluidically or even fluid tightly coupled with both fluid ports of the mounting device. Thereby, in the access position, a user can insert a sample separation unit in the mounting device or can remove it from the mounting device, without the need to form or release fluid connections of the sample separation unit by hand.

In the context of this application, the term "fluid coupling position" in particular denotes a defined (and different from the access position) operation position, in which a fluidic (or even fluid tight and/or high-pressure tight) coupling between the sample separation unit and the fluid ports of the mounting device is formed. In the fluid coupling position, a sample separation unit which is received in the mounting device may be deprived of a user access, for example by bringing the sample separation unit in an interior of a housing of the mounting device in the fluid coupling position.

In the context of this application, the term "fluid coupling mechanism" in particular denotes a (e.g., mechanical) mechanism which, starting from a configuration of the sample separation unit which is fluidically decoupled from one or both fluid ports of the mounting device, in the access position can form a configuration of the sample separation unit which is fluidically coupled with the fluid ports of the mounting device in the fluid coupling position, and vice versa. The actuation unit and the fluid coupling mechanism may cooperate, such that, by actuating the actuation unit, an activation or a deactivation of the fluid coupling mechanism is triggered.

According to an exemplary embodiment, a mounting device for a user-friendly and at the same time operationally reliable mounting and/or demounting of a sample separation unit is provided which is for example configured as a chromatographic separation column. By such a mounting device, after inserting the sample separation unit at an insertion position by a user, merely an actuation of the actuation unit may be sufficient to bring the sample separation unit from the insertion position to an operation position, where the sample separation unit is then prepared for the sample separation without further measures. Here, the insertion position of the sample separation unit corresponds to the access position, and the operation position of the fluid separation unit corresponds to the fluid coupling position. Advantageously, merely spatially transferring the sample separation unit in the operation position can lead to a fluid coupling between the sample separation unit and one or two fluid ports of the mounting device at the same time. Besides inserting the sample separation unit and intuitively actuating the actuation unit (for example pushing-in a drawer in a housing of the mounting device), a user needs nothing else to do to accomplish the fluid coupling of the sample separation unit in the sample separation device. This enables, even for a user without special expertise, a reliable mounting of the sample separation unit in the sample separation device under simultaneously forming a fluid coupling, to render the sample separation unit operable for a fluid separation by the fluid separation device. The handling of capillaries or the like which is time-consuming, delicate, and prone to errors, and their connection to the sample separation unit, is dispensable when using a mounting device according to an exemplary embodiment of the invention. Consequently, a rapid, error-robust and user-friendly mounting of the sample separation unit in the sample separation device is enabled by the mounting device. After mounting the sample separation unit, due to the reliably formed fluid coupling of the sample separation unit in the sample separation device, a precise separation result can be obtained.

In the following, further embodiments of the mounting device, the sample separation device, and the method are described.

According to an embodiment, the mounting device may comprise a second fluid port for fluidically connecting to a second fluid connection point of the sample separation unit, wherein the fluid coupling mechanism is configured for forming the force-loaded fluidic coupling between the first fluid port and the first fluid connection point and between the second fluid port and the second fluid connection point, when the sample separation unit is transferred in the fluid coupling position by the actuation unit. Thus, two fluid connection positions of the column may be provided, which are coupled with two fluid ports when actuating the mechanism.

Alternatively, automatically establishing a fluidic connection is also possible with only one fluid port. For example, the column may be already sufficiently fluidically coupled at one side, and only when actuating the actuation unit (for example when displacing the drawer to a closed position (German: Zusammenfahren der Schublade)), also the second fluid connection point of the column may be fluidically coupled.

According to an embodiment, the actuation unit may comprise a drawer. A drawer is an actuation device which is intuitively actuatable by a user, which is merely to be transferred between two end positions in an error-robust manner, to transfer the actuation unit between the access position and the fluid coupling position. Advantageously, an open state of the drawer may correspond to the access position and a closed state of the drawer may correspond to the fluid coupling position.

According to an embodiment, the actuation unit may be configured, by a motion of the drawer, to cause a fluidic coupling between the first fluid port and the first fluid connection point and/or between the second fluid port and the second fluid connection point. In other words, by merely closing the drawer, it may be acted upon the fluid coupling mechanism, such that it realizes the fluid coupling which is assisted by a coupling force. In particular, merely closing the drawer by a user may lead to forming the fluid coupling position.

According to an embodiment, the drawer may be configured, for the adjustment of the access position, to be extended out of a housing, and for the adjustment of the fluid coupling position, to be retracted in the housing. In the access position, the drawer may be flush with the housing and does not enable an access of the user to the operable sample separation unit. Thereby, the operational safety can be increased, since a user can neither disturb a running separation process nor an undesirably touching of a sample separation unit, which is for example heated in the separation operation, by a user may occur. Furthermore, the described actuation logic is highly intuitive for a user.

According to an embodiment, the drawer may be configured to increase a distance between the first fluid port and the second fluid port, when transferring from the fluid coupling position in the access position, in particular under release of a sample separation unit which was previously fluid-tightly mounted between the first fluid port and the second fluid port. Vice versa, the distance between both fluid ports may be reduced to a length of the sample separation unit, when the actuation unit is transferred in its fluid coupling position. The mechanic energy which is required for changing the distance between both fluid ports may be applied by a user when he actuates the actuation unit for transferring between the access position and the fluid coupling position.

According to an embodiment, the mounting device may comprise at least one guiding rail along which the drawer is guided. In this way, only a longitudinal motion of the drawer between both described end positions is enabled, whereby an erroneous operation is made impossible.

According to an embodiment, the fluid coupling mechanism in the fluid coupling position may be configured for forming a high-pressure tight (in particular up to a pressure of at least 100 bar, further in particular of at least 1000 bar, fluid tight) fluidic coupling between the first fluid port and the first fluid connection point and between the second fluid port and the second fluid connection point. In an example, the fluid connection can withstand even a pressure of at least 1200 bar or even at least 1500 bar, without a leakage of the fluidic sample or of the mobile phase occurring between a respective fluid port of the mounting device and a respective fluid connection point of the sample separation unit. The mentioned pressures may occur at modern HPLC sample separation devices, for example.

According to an embodiment, the first fluid port may be a first fitting and/or the second fluid port may be a second fitting. A fluid port which is configured as a fitting may form a fluid connection between the sample separation unit and fluid conduits or capillaries which adjoin the respective fluid port, for example by inverse conical components, ferrules, housing components which can be screwed to each other, sealing elements, etc.

According to an embodiment, the first fluid port may be stationarily attached at the actuation unit. For example, the first fluid port may be rigidly mounted to a drawer which may form the actuation unit. When inserting the sample separation unit in the mounting device, a user may place the first fluid connection point at the first fluid port, while the second fluid connection point in the access position may be located with a distance from the second fluid port.

According to an embodiment, the second fluid port may be configured displaceable along the actuation unit. For example, by an actuation by the user, the second fluid port may be moved relatively to the drawer which may form the actuation unit in an embodiment. When transferring the actuation unit from the access position in the fluid coupling position, the displaceable or slidable second fluid port moves towards the stationary first fluid port. Then, both fluid ports engage the sample separation unit on both sides in a fluid-coupling force-looking manner. In this way, it is dispensable that a user must perform complicated actions with respect to the handling of capillaries and small connection component parts, instead, the fluid coupling is automatically accomplished by the mounting device. On the other hand, this fluid coupling is advantageously performed under an application of a defined coupling force which is supplied by a user during definedly moving the actuation unit from the access position in the fluid coupling position and which may be delimited by a stop in the fluid coupling position. Advantageously, a too low coupling force is thereby avoided, whereby a reliable fluid seal can be ensured. However, simultaneously, also an excessive coupling force is made impossible, which could damage the fluid ports and/or the sample separation unit. In other words, a coupling force which is defined and pregiven (or predetermined) by the construction of the mounting device is exerted upon the sample separation unit.

According to an embodiment, the actuation unit may be configured to change a position and/or orientation of the sample separation unit when transferring between the access position and the fluid coupling position. Therefore, a handling position of the sample separation unit which enables mounting and/or demounting by a user may be different from an operation position of the sample separation unit which is fluidically coupled to the sample separation device for the sample separation. Hence, the transfer between the access position and the fluid coupling position is also accompanied by a spatial displacement and/or a reorientation of the sample separation unit. This advantageously enables for a user to handle the sample separation unit from exterior and/or spatially separated from the frequently harsh conditions (for example at high temperatures in a column oven) at the operation location of the sample separation unit in the sample separation device (in particular at ambient temperature).

According to an embodiment, the fluid coupling mechanism may be configured to exert a tensile force on the second fluid port for a force-loading. Descriptively, the fluid coupling mechanism may draw the second fluid port in the direction of the first fluid port and may thereby form the fluid coupling between the fluid ports and the sample separation unit which is arranged between them.

According to an embodiment, the fluid coupling mechanism may be configured to accomplish the force-loading by a tensile element, in particular a tensile rope, which can be set under tensile stress, in particular is tensible, by transferring the sample separation unit in the fluid coupling position. A tensile rope is a mechanical embodiment for a tensile element which is operable in a simple and error-robust manner, for causing the force-transmission to the movable fluid port, and also enables deflecting such a force, so that the mounting device can be formed in a compact manner. However, alternatively, the force transmission may be performed by other mechanical mechanisms, for example by using a gear wheel or the like.

According to an embodiment, the tensile element, which is for example configured as tensile rope, may be stationarily attached to the actuation unit at one end and may be coupled with the second fluid port at another end. Descriptively, when moving the actuation unit (in particular configured as drawer) from the access position in the fluid coupling position, the stationary end of the tensile rope may follow the motion of the drawer or the like, whereby, along the tensile rope, a tensile force is exerted upon the movable fluid port, which moves it towards the stationarily mounted fluid port. In this way, by an error-robust mechanism, the actuation force of the user can be converted in a coupling force of the sample separation unit between the fluid ports.

According to an embodiment, the mounting device may comprise a tension unit, in particular a spring unit, for generating a tensioning force which promotes the fluid coupling when transferring in the fluid coupling position. For example, the mounting device may comprise a spring unit at and/or in the tensile rope. Such a tension unit may generate a biasing force, by which the sample separation unit in the fluid coupling position is clamped in a fluid tight manner between both fluid ports of the mounting device. Advantageously, such a tension unit may be configured as a mechanical spring (in particular in a tensile rope) which is tensioned when transferring in the fluid coupling position under generation of a biasing force. For example, such a mechanical spring may be a coil spring or a leaf spring, or also a plurality of mechanical single springs (for example a leaf spring package). It is also possible to generate the biasing force of the tension unit in another way, for example by magnetic elements which are attracting each other, which are removed from each other when transferring in the fluid coupling position, and which thereby generate a restoring magnetic force as biasing force.

According to an embodiment, the mounting device may comprise at least one deflection element, in particular at least one deflection roller, around which the tensile element, in particular the tensile rope, is deflected. Providing one or more deflection rollers or other deflection elements enables a realization of the mounting device even under constricted space conditions, since the tensile rope which is deflected by the deflection roller(s) can be arranged in almost arbitrary free spaces of the mounting device.

According to an embodiment, the mounting device may comprise a reception unit (in particular a column bed) which is configured for an aligned reception of the sample separation unit for fluidically coupling between the first fluid port and the second fluid port. For example, a user may (for example horizontally) insert a sample separation unit in the reception unit or place or plug it (for example vertically) on the reception unit. The sample separation unit is automatically located at the reception unit at the correct position and/or in a correct orientation, to be transferred in the fluid coupling position by a mere actuation of the actuation unit.

According to an embodiment, the mounting device may be configured for mounting and/or demounting the sample separation unit without a tool by a user. The operation of the mounting device by a user is thereby enabled in an especially simple manner. Complicated activities, such as a screwing capillaries with fittings by the user are not required anymore.

According to an embodiment, the mounting device may comprise a preheating unit (in particular directly) upstream of the first fluid port, for preheating the fluidic sample before reaching the sample separation unit. Such a preheating unit enables to bring the fluidic sample to an increased target-temperature directly before its separation in the sample separation unit, to generate defined or beneficial separating conditions. When such a preheating unit is arranged directly adjoining the first fluid port, an undesired cooling effect between preheating and separating can be prevented or at least strongly suppressed.

According to an embodiment, the mounting device may be configured as a chromatographic column oven. During a separation process, it may be required or desirable to bring the sample separation unit which is configured as column to a desired temperature. For this purpose, the column is mounted in a column oven and is heated there. Mounting a column in a column oven is possible for a user in a comfortable manner using a mounting device according to an exemplary embodiment of the invention, since the sample separation unit is inserted outside the column oven in the access position of the actuation unit, and only by the transfer of the actuation unit in the fluid coupling position is inserted in the column oven. Thereby, it is also possible for a user to perform the handling of the sample separation unit at ambient temperature and not at the high temperatures (of for example up to 100° C. or even up to 150° C.) which may be present in a column oven. This increases not only the operation comfort, but also the operational safety.

Figure 2:
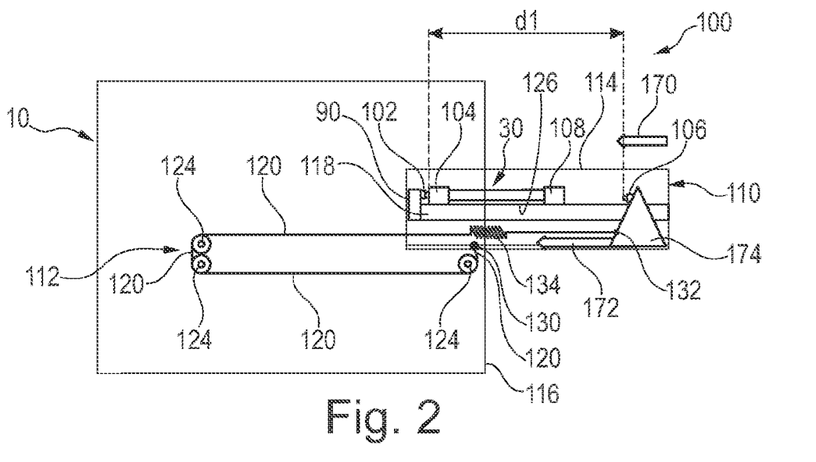
FIG. 2 shows a mounting device according to an exemplary embodiment of the present disclosure in an operational state in which a user can insert a sample separation unit in the mounting device or can remove the sample separation unit from the mounting device.
Figure 3:
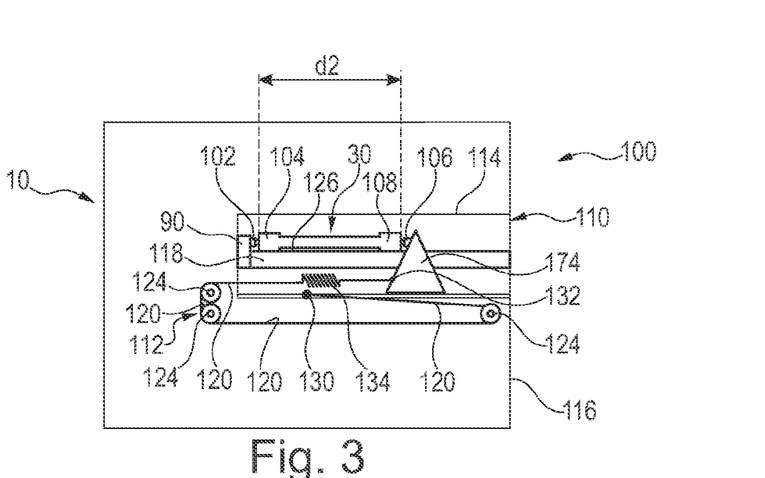
FIG. 3 shows the mounting device according to FIG. 2 in another operational state in which a user has inserted a sample separation unit in the mounting device and, by actuating a drawer, has transferred the sample separation unit in the interior of the mounting device under formation of a force-loading which fluidically couples the sample separation unit.

According to an embodiment, the actuation unit and the fluid coupling mechanism may be configured to perform a motion of the actuation unit when transferring between the access position and the fluid coupling position on the one hand and a relative motion between the first fluid port and the second fluid port on the other hand in motion directions which are parallel to each other (compare FIG. 2 and FIG. 3). In other words, the motion of the actuation unit, which is for example configured as drawer, between the access position and the fluid coupling position may be performed in the same direction as the motion of the second fluid port towards the first fluid port for forming the fluid coupling of the sample separation unit. This enables an especially simple mechanics. For example, a sample separation unit may be horizontally inserted in a reception unit of the mounting device and may be (in particular high-pressure-tightly) fluid-connected by merely closing a drawer.

Figure 4:
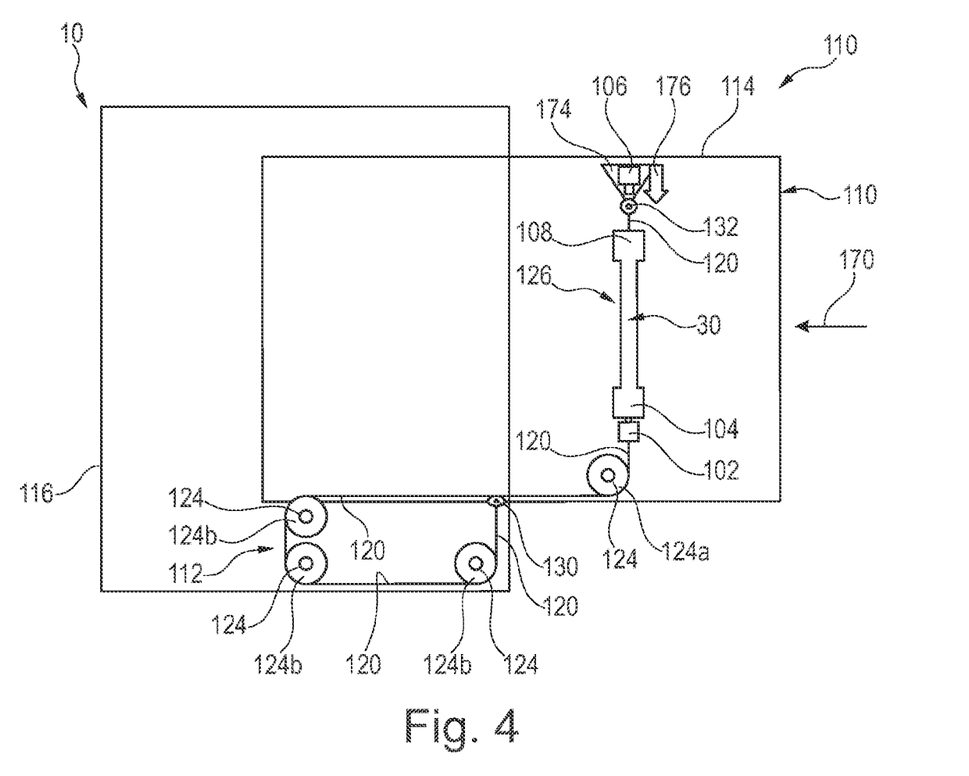
FIG. 4 shows a mounting device according to another exemplary embodiment of the present disclosure in an operational state in which the user can insert a sample separation unit in the mounting device or can remove the sample separation unit from the mounting device.

According to another embodiment, the actuation unit and the fluid coupling mechanism may be configured to perform a motion of the actuation unit when transferring between the access position and the fluid coupling position on the one hand and a relative motion between the first fluid port and the second fluid port on the other hand in motion directions which are orthogonal to each other (see for example FIG. 4). For example, it may be preferred to insert a sample separation unit (such as a chromatographic separation column) in a vertical orientation in the mounting device, and to subsequently trigger the fluid coupling of the fluid separation unit with a vertical coupling force by a horizontal displacing motion of an actuation unit which is configured as drawer. Here, a redirecting of the force direction by the fluid coupling mechanism may be performed, for example using a tensile rope in combination with deflection rollers.

According to an embodiment, the first fluid port and the second fluid port may be configured for fluidically connecting a horizontally oriented sample separation unit. Alternatively, the first fluid port and the second fluid port may be configured for fluidically connecting a vertically oriented sample separation unit. When transferring from the access position in the fluid coupling position or vice versa, the sample separation unit may maintain its horizontal or vertical orientation, or the sample separation unit may be reoriented (for example using a pivoting mechanism).

According to an embodiment, the actuation unit and/or the fluid coupling mechanism may be configured, when the transfer in the fluid coupling position is completed, to output a feedback which is indicating this circumstance, in particular a haptic feedback. For example, the sample separation unit may audibly or perceptibly latch, when it is brought in a sealed fluid connection with both fluid ports of the mounting device. A user receives a distinct feedback that the mounting process is successfully completed and a sample separation can now be performed in a fluid tight manner.

According to an embodiment, the sample separation device may be configured as a microfluidic measuring device, a liquid chromatography device, or a HPLC, for example. Thus, the sample separation device in particular may be configured as a HPLC-device (high-performance liquid chromatography or high-performance liquid chromatography), a life science device, or an SFC-device (supercritical fluid chromatography). However, also other applications are possible.

According to an embodiment, the sample separation device may be configured in a pressure tight manner, for an operation at a pressure of up to approximately 100 bar, in particular for an operation at a pressure of up to approximately 500 bar, further in particular for an operation at a pressure of up to approximately 1000 bar.

According to an embodiment, the sample separation device may comprise a separation column as sample separation unit for separating different fractions of the injected fluid sample. Such a separation column may be filled with an adsorption medium, for example porous beads made of silica gel or active carbon. By a chemical interaction with these porous beads, the fluidic sample may be temporarily immobilized or absorbed at the separation column. For example, by an adjustment of a gradient of a solvent composition, the single fractions of the fluidic sample can be individually released or desorbed and may be subsequently detected.

According to an embodiment, the analytical pump may be configured for conveying the injected fluid sample commonly with a mobile phase. The mobile phase may be a solvent composition which may be constant over time or may be changed in an adjustable manner, and which is mixed with the fluid sample after inserting the fluid sample through the injection valve in the sample separation path. The mixture of the mobile phase and the fluid sample may be pumped through the chromatographic separation path by an analytical pump which is configured as a high-pressure pump. Thus, the sample separation device may comprise one or more pumps for conveying the injected fluid sample commonly with a mobile phase through at least a part of the sample separation device. For example, such a pump may be configured for pumping the mobile phase with a high pressure, for example some 100 bar up to 1000 bar and more through the system.

According to an embodiment, the sample separation device may comprise a sample detector for detecting the separated sample components of the fluid sample. Such a sample detector may be based on a detection principle which detects electromagnetic radiation (for example in the UV-range or in the visible range), which originates from certain sample components of the fluid sample.

Alternatively or additionally, the measuring device may comprise a sample fractionator for fractionizing the separated sample components. Such a fractionator may lead the different sample components in different liquid containers, for example. However, the analyzed fluid sample may also be supplied to a waste container.

BRIEF DESCRIPTION OF DRAWINGS

Other objects and many of the accompanying advantages of embodiments of the present disclosure become easily recognizable and better understandable under reference to the following detailed description of embodiments in connection with the accompanying drawings. Features which are substantially or functionally same or similar, are provided with the same reference signs.

The illustrations in the drawings are schematic.

DETAILED DESCRIPTION

Before, referring to the drawings, exemplary embodiments of the invention are described, subsequently some considerations are illustrated, based on which exemplary embodiments of the invention have been developed.

According to an exemplary embodiment of the invention, a mounting device for mounting a sample separation unit is provided, such as a chromatographic separation column, wherein a user merely inserts the sample separation unit in an access position in an actuation unit, and by merely actuating the actuation unit can accomplish both a spatial transfer of the sample separation unit to a target position in the interior of a sample separation device and the automatic formation of a fluid coupling between the inserted sample separation unit and fluid ports of the mounting device.

In particular, for this purpose, a drawer system may be implemented which functions both for receiving the sample separation unit and for displacing the sample separation unit to a target position, as well as for simultaneously forming a fluidic coupling of the sample separation unit with the fluid ports of the sample separation device. By pulling out the drawer, the fluid ports can be shifted forwardly and can thereby be made accessible for a user. At the same time, by the pulling-out, a distance between the fluid ports may increase, to enable a convenient insertion of the sample separation unit. After inserting the sample separation unit, a user merely needs to shift back the drawer, whereby a fluid coupling mechanism of the mounting device approaches the fluid ports to each other, until they engage fluid connection points of the sample separation unit on both sides and thereby realize a fluidic coupling of the sample separation unit. The shifting kinematics of the mounting device may be configured such that a user, besides inserting the sample separation unit and pulling-out or pushing-in the drawer, needs nothing else to do, to condition the sample separation unit for a sample separation by the sample separation device. Advantageously, at such a mounting device, the location of inserting the sample separation unit by a user from exterior and the location of the use of the sample separation unit in the interior of the sample separation device (for example in a heated region of a column oven) are different from each other. This enables for a user the insertion of the sample separation unit outside of the harsh conditions (for example a high temperature) which may prevail at the location of its use during the sample separation.

One of both fluid ports of the mounting device may be connected to a preheating unit for preheating a sample to be separated and/or a mobile phase which is used for this purpose, to operate the sample separation unit and the fluids which flow through it at a desired temperature. In different embodiments of the mounting device, inserting the sample separation unit may be performed by horizontally inserting or by vertically inserting. When transferring the sample separation unit between the access position and the fluid coupling position, the sample separation unit can be linearly displaced or pivoted (for example by a pivoting lever and/or a pivoting mechanism).

The cooperation of an actuation unit and a fluid coupling mechanism of the mounting device according to an exemplary embodiment of the invention may advantageously encompass transferring the sample separation unit from an insertion location to an operation location and forming a fluid coupling of the sample separation unit with the sample separation device which is accompanying the transfer without a further action. According to an embodiment, the fluid coupling may be high-pressure tight, in particular fluid-tight at a pressure of up to at least 100 bar or up to at least 1500 bar. Thus, exemplary embodiments of the invention connect a sample separation unit with a sample separation device in a rapid and secure manner, without requiring special demands to the qualification or the skill of a user. In an embodiment, the actuation unit and/or the fluid coupling mechanism may be configured such that a user receives a feedback, when the fluid connection of the sample separation unit is correctly completed. Such a feedback may be a haptic, acoustic, and/or optical feedback, for example. For example, latching the sample separation unit at a target position under formation of the fluid connection between the sample separation unit and the sample separation device may be audible and/or noticeable, or a separate signal may be output, when the fluid coupling is performed.

The cooperation of an actuation unit and a fluid coupling mechanism of the mounting device according to an exemplary embodiment of the invention may advantageously encompass transferring the sample separation unit from an insertion location to an operation location and forming a fluid coupling of the sample separation unit with the sample separation device which is accompanying the transfer without a further action. In an embodiment, the fluid coupling may be high-pressure tight, in particular fluid tight at a pressure of up to at least 100 bar or up to at least 1500 bar. Thus, exemplary embodiments of the invention connect a sample separation unit with a sample separation device in a rapid and secure manner, without requiring special demands to the qualification or the skill of a user. In an embodiment, the actuation unit and/or the fluid coupling mechanism may be configured such that a user receives a feedback, when the fluid connection of the sample separation unit is correctly completed. Such a feedback may be a haptic, acoustic, and/or optical feedback, for example. For example, latching the sample separation unit at a target position under formation of the fluid connection between the sample separation unit and the sample separation device may be audible and/or noticeable, or a separate signal may be output, when the fluid coupling is performed.

According to an exemplary embodiment, an actuation unit which is configured as drawer may be combined with a fluid coupling mechanism which performs a fluidic coupling of a sample separation unit which is triggered by a motion of the drawer. Thereby, a tool-free column connection is enabled. In other words, connecting the column may be performed with a mounting device which functions according to the drawer principle. Such a tool-free column connector is advantageous for the simple installation of a column without a tool and for a high operational safety for forming a reliable fluid connection. An advantage of such an embodiment is that the user does not need to use any tools and can nevertheless be sure that a mounted sample separation unit is installed in a fluid tight manner.

Thus, according to an embodiment of the invention, a mounting device may be provided which comprises a liquid chromatography housing for the column compartment. Furthermore, a drawer may be provided which slides on rails and is attached to a spring-loaded displacement system. In the drawer, a column bed is provided, to ensure that the column is correctly aligned. The drawer may comprise a fixed fitting at the outermost end and a movable fitting at the proximate end. A spring-loaded connection mechanics may be activated when the drawer is closed. The closure of the drawer may advantageously lead to a tensile stress at the column for fluid tightly connecting with both fittings.

Figure 1:
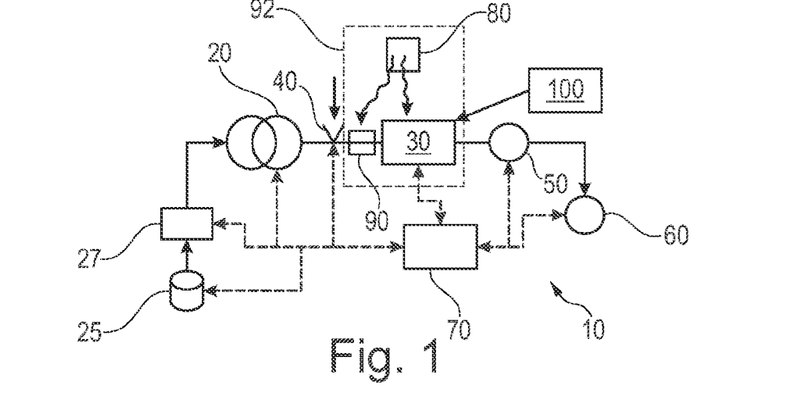
FIG. 1 shows a HPLC sample separation device according to an exemplary embodiment of the present disclosure.

FIG. 1 shows the principal construction of a HPLC system as an example for a sample separation device 10, as it may be used for the liquid chromatography, for example. A fluid conveying unit 20, which is for example configured as an analytic pump, drives a mobile phase, which is provided by at least one solvent container 25 and may be degassed by a degasser 27, through a separation device as sample separation unit 30 (such as a chromatographic column) which contains a stationary phase. A sample insertion unit, which is also denoted as sample injector or only injector 40, is arranged between the fluid conveying unit 20 and the sample separation unit to introduce a fluidic sample in the mobile phase by a fluid switch (which can be considered as belonging to the injector 40). The stationary phase of the sample separation unit 30 is intended for separating sample components of the sample liquid, for example according to the principle of a liquid chromatography. A detector 50 detects the separated sample components of the fluidic sample, and a fractionizing device 60 may be provided to output separated sample components of the sample liquid, for example in containers which are provided for this purpose or a drain. A control unit 70 controls the components of the sample separation device 10.

While a liquid path between the fluid conveying unit 20 and the sample separation unit is typically under high pressure, the sample liquid is introduced under normal pressure at first in a region which is separated from the liquid path, a so-called sample loop (as sample receiving volume) of the injector 40 which in turn introduces the sample liquid in the liquid path which is under high pressure. When introducing the sample liquid, which is in the sample loop at first under normal pressure, into the liquid path which is under high pressure, the content of the sample loop is abruptly (typically in a range of milli-seconds) brought to the system pressure of the sample separation device 10.

It can also be seen in FIG. 1 that the sample separation unit 30 is arranged in a tempering chamber 92 commonly with a preheating unit 90 and can be heated there by a heating source 80. In this way, the sample separation unit 30 can be brought to a desired target temperature which may be desired or pregiven (or predetermined) for a sample separation method.

Moreover, FIG. 1 schematically shows a mounting device 100 according to an exemplary embodiment of the invention for mounting and demounting the sample separation unit in the sample separation device 10. Referring to FIG. 2 to FIG. 4, some examples of embodiments for such a mounting device 100 are described in the following.

FIG. 2 and FIG. 3 show a mounting device 100 for mounting a sample separation unit 30 for separating a fluidic sample in a sample separation device 10 which is here configured for the liquid chromatography, according to an exemplary embodiment of the invention, in different operational states. In more detail, FIG. 2 shows the mounting device 100 in an operational state, in which a user can insert a sample separation unit 30 which is configured as a chromatographic separation column in the mounting device 100, or can remove the sample separation unit 30 from the mounting device 100 (for example for a column exchange). In contrast, FIG. 3 illustrates the mounting device 100 in another operational state, in which the user has already inserted the sample separation unit 30 in the mounting device 100 and, by actuating a drawer 114, has transferred the sample separation unit 30 into the interior of the mounting device 100 under formation of a force-loading which is fluidically coupling the sample separation unit 30. The mounting device 100 according to FIG. 2 and FIG. 3 serves for handling the sample separation unit 30 at and in a chromatographic column oven (compare reference sign 92 in FIG. 1).

The mounting device 100 which is illustrated in FIG. 2 and FIG. 3 comprises a first fluid port 102 for fluidically connecting to a first fluid connection point 104 of the sample separation unit 30. Here, the first fluid port 102 may be a high-pressure fitting which shall be fluidically connected to the first fluid connection point 104, which is configured as a column entrance, of the sample separation unit 30. The first fluid port 102 is rigidly attached to the drawer 114 and therefore uniformly co-moves with the drawer 114, when it is displaced by a user. Thus, the first fluid port 102 is stationarily attached to the actuation unit 110.

The mounting device 100 further comprises a second fluid port 106 for fluidically connecting to a second fluid connection point 108, which is configured as a column exit, of the sample separation unit 30. In the operation of the sample separation device 10, the fluidic sample or the mobile phase which originates from the injector 40 flows through the first fluid port 102 in the first fluid connection point 104 and through the sample separation unit 30, exits through the second fluid connection point 108 of the sample separation unit 30 in the second fluid port 106 and subsequently flows in the direction of the detector 50 according to FIG. 1. The second fluid port 106 may be a further high-pressure fitting. Both fluid ports 102, 106 and the sample separation unit 30 may be configured in cooperation with the actuation unit 110 and a fluid coupling mechanism 112 described in detail below for forming a high-pressure tight fluid connection which reliably prevents a liquid leakage even at pressures of 1200 bar and more. In contrast to the first fluid port 102, the second fluid port 106 is configured to be displaceable along the actuation unit 110. In other words, a relative motion between the second fluid port 106 and the drawer 114 occurs, when the drawer 114 is extended out of a housing 116 or is displaced into the housing 116.

The mounting device 100 further includes the already mentioned actuation unit 110 which is actuatable by a user for transferring the mounting device 100 between an access position which renders the sample separation unit 30 accessible for a user (compare FIG. 2) and a fluid coupling position which fluidically couples the sample separation unit 30 (see FIG. 3). As a comparison of FIG. 2 with FIG. 3 shows, the actuation unit 110 is configured, when transferring between the access position and the fluid coupling position, to change a position of the sample separation unit 30 between an inserting position or removing position according to FIG. 2 and a fluid coupling position or fluid separation position according to FIG. 3. In the access position according to FIG. 2, a user can insert a sample separation unit 30 in a reception unit 126, which is configured as a column bed, or can remove the sample separation unit 30 from the reception unit 126 (for example for a column exchange). Thus, the reception unit 126 which is configured as column bed serves for an aligned reception of the sample separation unit 30 for fluidically coupling between the first fluid port 102 and the second fluid port 106. Hence, in the access position, the sample separation unit 30 is accessible for a user, but fluidically not connected between the fluid ports 102, 106. In the fluid coupling position according to FIG. 3, the reception unit 126 and the sample separation unit 30 are accommodated in an interior of the housing 116 inaccessibly for a user, so that the user does not have any access to it. However, in contrast to the access position, the sample separation unit 30 in the fluid coupling position is fluidically connected in the sample separation device 100 by forming a first fluid tight connection between the first fluid port 102 and the first fluid connection point 104 and a second fluidic connection between the second fluid port 106 and the second fluid connection position 106.

To accomplish this fluid coupling of the sample separation unit 30 at the transition of the mounting device 100 in the fluid coupling position, the mounting device 100 is equipped with a fluid coupling mechanism 112 which is configured for forming a force-loaded fluidic coupling between the first fluid port 102 and the first fluid connection point 104 and between the second fluid port 106 and the second fluid connection point 108, when the sample separation unit 30 is transferred in the fluid coupling position by the actuation unit 110.

In the following, the design of the actuation unit 110 and the fluid coupling mechanism 112 are described in more detail.

As already mentioned, the actuation unit 110 comprises a drawer 114 which is horizontally displaceable. A corresponding motion direction is illustrated in FIG. 2 with an arrow 170. The actuation unit 110 is configured, by a motion of the drawer 114 along a displacing direction according to arrow 170, to form a fluidic coupling between the first fluid port 102 and the first fluid connection point 104 and between the second fluid port 106 and the second fluid connection point 118. Furthermore, the drawer 114 is configured to be extended out of the housing 116 for the access position according to FIG. 2, and to be retracted in the housing 116 for the fluid coupling position according to FIG. 3. Besides inserting and/or removing the sample separation unit 30 and actuating the drawer 114, a user does not need to do anything further, to render the sample separation unit 30 operable for the performance of a sample separation task in the sample separation device 10.

In more detail, the drawer 114 is configured, when transferring from the fluid coupling position in the access position, to increase a distance between the first fluid port 102 and the second fluid port 106 starting from a smaller distance value d2 according to FIG. 3 to a larger distance value d1>d2 according to FIG. 2. With the increase of the distance between both fluid ports 102, 106 which engage the sample separation unit 30 in a force-locking manner according to FIG. 3, a release of the sample separation unit 30 is performed which previously was fluid-tightly mounted between the first fluid port 102 and the second fluid port 106. This enables the removal of the sample separation unit 30 after pulling the drawer 114 out of the housing 116. The increase in distance between the fluid ports 102, 106 during the transition in the access position also facilitates an insertion of a new sample separation unit 30 in the reception unit 126.

FIG. 2 and FIG. 3 show that the mounting device 100 comprises a horizontally arranged guiding rail 118 along which the drawer 114 is guided. An erroneous operation of the mounting device 100 by a user is therefore almost excluded, since the user merely must transfer the drawer 114 between both opposite end positions, to mount or to demount the inserted sample separation unit 30.

As can be recognized by means of FIG. 2 and FIG. 3, the fluid coupling mechanism 112 is configured to exert a sealing tensile force on the second fluid port 106 for a force-loading of the sample separation unit 30 in the fluid coupling state. In the shown embodiment of the fluid coupling mechanism 112, this is achieved by causing the force-loading by a tensile rope 120. The tensile rope 120 is tensioned by transferring the sample separation unit 30 from the access position into the fluid coupling position. For this purpose, the tensile rope 120 at one end 130 is stationarily attached to the actuation unit 110 which is configured as a drawer 114. Thus, the end 130 uniformly moves along with the drawer 114. On the contrary, at its opposing other end 132, the tensile rope 120 is coupled with the second fluid port 106. When a user closes the drawer 114 by a motion in the direction of the arrow 170, the first fluid port 102, the sample separation unit 30 and the end 130, in a manner rigidly coupled to each other, are displaced in the housing 116 and follow the motion of the drawer 114. By the end 130 consequently moving towards the left side according to FIG. 2, a tensile force is generated on the tensile rope 120 at its end 130, which pulls the opposing end 132 of the tensile rope 120, and along with it the second fluid port 106, which is connected with it, towards the left side according to FIG. 2. The corresponding motion direction is illustrated by an arrow 172 and can be transferred by an optional force transmission body 174 between the end 132 and the second fluid port 106. Due to the described kinematics, the second fluid port 106 approaches the second fluid connection point 108 and finally engages the latter in a force-locking manner. Thereby, a high-pressure capable fluid coupling between the sample separation unit 30 and the fluid ports 102, 106 is established.

A spring unit 134 (or more general a biasing unit), which is configured as a coil spring in the illustrated embodiment, in the tensile rope 120 is deflected (in more detail stretched) in the described procedure and thereby generates a restoring tensioning force at the end 132. This tensioning force has the tendency to bias the second fluid port 106 against the second fluid connection point 108 of the sample separation unit 30. Thereby, the fluid tight coupling of the sample separation unit 30 is reinforced on both sides.

Moreover, FIG. 2 and FIG. 3 show multiple deflection rollers 124, around which the tensile rope 120 is deflected. The deflection rollers 124 function in cooperation with the tensile rope 120 as a force converter and enable the described force-loading fluid coupling of the sample separation unit 30 even under constricted space conditions and therefore in a compact manner.

Advantageously, the operating mechanism of the mounting device 100 which is described with reference to FIG. 2 and FIG. 3 enables mounting and demounting the sample separation unit 30 by a user without a tool. Special expertise of a user is thereby dispensable. Advantageously, elaborately handling miniaturized capillaries and fittings by the user is not necessary anymore.

By the mounting device 100 comprising a preheating unit 90 directly upstream of the first fluid port 102, preheating the fluidic sample directly before reaching the sample separation unit 30 is enabled. The simply operable mounting device 100 therefore also enables a precise sample separation at defined pregiven (or predetermined) separating conditions.

The arrows 170, 172 which are in parallel to each other show that the actuation unit 110 and the fluid coupling mechanism 112 according to FIG. 2 and FIG. 3 are configured to perform the transfer between the access position and the fluid coupling position on the one hand and a relative motion between the first fluid port 102 and the second fluid port 106 on the other hand in motion directions which are parallel to each other and which are horizontal in the shown embodiment. Correspondingly, according to FIG. 2 and FIG. 3, the first fluid port 102 and the second fluid port 106 are configured for fluidically connecting a horizontally oriented sample separation unit 30.

Advantageously, the actuation unit 110 and the fluid coupling mechanism 112 may be configured to output a haptic feedback when the transfer in the fluid coupling position is completed. For example, a noticeable and audible latching may occur, when the fluid coupling of the sample separation unit 30 with the fluid ports 102, 106 is formed.

Advantageously, the configuration according to FIG. 2 and FIG. 3 is compatible with the use of sample separation units 30 of different lengths. A sample separation unit 30 which is freely selectable within a larger length range is merely to be placed on the receiving unit 126, for example in a left-aligned manner (i.e., adjoining the first fluid port 102). The coupling of the second fluid port 106 by closing the drawer 114 is performed by a motion of the second fluid port 106 according to FIG. 2 and FIG. 3 towards the left side, until the second fluid port 106 abuts against the second fluid connection point 108 of the sample separation unit 30. When pushing the drawer 114 in the housing 116, the fluid connection gets tight. Therefore, a user is free to use sample separation units 30 of different sizes with one and the same mounting device 100.

FIG. 4 shows a mounting device 100 according to another exemplary embodiment of the invention in an operational state in which a user can insert a sample separation unit 30 in the mounting device 100 or can remove the sample separation unit 30 from the mounting device 100.

The embodiment according to FIG. 4 differs from the embodiment according to FIG. 2 and FIG. 3 substantially in that, according to FIG. 4, the sample separation unit 30 is vertically (and not horizontally) inserted in the mounting device 100, and in that the motion of the drawer 114 is performed according to the direction of the arrow 170 perpendicularly (and not parallel) to a motion of the second fluid port 106 towards the first fluid port 102, see arrow 176.

Therefore, according to FIG. 4, the actuation unit 110 and the fluid coupling mechanism 112 are configured to perform the transfer of the mounting device 100 between the access position which is illustrated in FIG. 4 and the fluid coupling position which is not illustrated on the one hand and a relative motion between the first fluid port 102 and the second fluid port 106 on the other hand in motion directions which are orthogonal to each other (see reference signs 170, 176). Furthermore, the first fluid port 102 and the second fluid port 106 are configured for fluidically connecting a vertically oriented sample separation unit 30.

In FIG. 4, a first deflection roller 124a is attached to the drawer 114, whereas second deflection rollers 124b are rigidly mounted at the housing 116.

When, starting from the access position according to FIG. 4, the drawer 114 is displaced in the housing 116 according to the motion direction of arrow 170, the end 130 of the tensile rope 120 which is rigidly mounted to the drawer 114 moves to the left side according to FIG. 4 and thereby exerts a tensile force on the tensile rope 120. This tensile force is transferred along the tensile rope 120 to the opposing end 132 of the tensile rope 120, whereby the second fluid port 106 is moved downwardly according to the direction of the arrow 176 and engages with the second fluid connection point 108 of the sample separation unit 30 in a sealing manner.

It is to be noted that the term "comprise" does not exclude other elements and the term "a" does not exclude a plurality. Also, elements may be combined which are described in connection with different embodiments. It is also to be noted that reference signs in the claims are not to be construed as limiting the protection scope of the claims.

The invention claimed is:

1. A mounting device for mounting a sample separation unit for separating a fluidic sample in a sample separation device, the mounting device comprising:
   - a first fluid port for fluidically connecting to a first fluid connection point of the sample separation unit;
   - an actuation unit actuatable by a user for transferring between an access position that renders the sample separation unit accessible for the user, and a fluid coupling position that fluidically couples the sample separation unit, wherein the actuation unit comprises a drawer; and
   - a fluid coupling mechanism configured, by a motion of the drawer, to form a force-loaded fluidic coupling between the first fluid port and the first fluid connection point, when the sample separation unit is transferred into the fluid coupling position by the actuation unit.

2. The mounting device according to claim 1, wherein the drawer is configured to be extended out of a housing for transferring into the access position, and to be retracted in the housing for transferring into the fluid coupling position.

3. The mounting device according to claim 1, comprising a second fluid port for fluidically connecting to a second fluid connection point of the sample separation unit, wherein the first fluid port is a first fitting and/or the second fluid port is a second fitting.

4. The mounting device according to claim 1, comprising a second fluid port for fluidically connecting to a second fluid connection point of the sample separation unit, and further comprising at least one of the following features:
   - wherein the first fluid port is fixed to the actuation unit;
   - wherein the second fluid port is configured to be displaceable along the actuation unit by moving the actuation unit.

5. The mounting device according to claim 1, wherein the actuation unit is configured to change a position and/or an orientation of the sample separation unit when transferring between the access position and the fluid coupling position.

6. The mounting device according to claim 4, wherein the fluid coupling mechanism is configured to exert a tensile force on the second fluid port for force-loading.

7. The mounting device according to claim 1, wherein the fluid coupling mechanism is configured to form the force-loaded fluidic coupling by a tensile element configured to be set under tensile stress by transferring the sample separation unit into the fluid coupling position.

8. The mounting device according to claim 7, comprising at least one of the following features:
   - comprising a second fluid port for fluidically connecting to a second fluid connection point of the sample separation unit, wherein the tensile element at one end is fixed to the actuation unit and at another end is coupled with the second fluid port;
   - comprising at least one deflection element around which the tensile element is deflected.

9. The mounting device according to claim 1, comprising a tension unit configured to generate a tensioning force that promotes the force-loaded fluidic coupling when transferring into the fluid coupling position.

10. The mounting device according to claim 4, comprising a reception unit configured for an aligned reception of the sample separation unit for fluidically coupling between the first fluid port and the second fluid port.

11. The mounting device according to claim 1, comprising a second fluid port for fluidically connecting to a second fluid connection point of the sample separation unit,
   - wherein the fluid coupling mechanism in the fluid coupling position is configured to form a high-pressure tight fluidic coupling between the first fluid port and the first fluid connection point, and between the second fluid port and the second fluid connection point.

12. The mounting device according to claim 1, comprising a second fluid port for fluidically connecting to a second fluid connection point of the sample separation unit, and further comprising at least one of the following features:
   - wherein the actuation unit and the fluid coupling mechanism are configured to perform a motion of the actuation unit when transferring between the access position and the fluid coupling position on the one hand and a relative motion between the first fluid port and the second fluid port on the other hand in motion directions that are parallel to each other;
   - wherein the actuation unit and the fluid coupling mechanism are configured to perform a motion of the actuation unit when transferring the mounting device between the access position and the fluid coupling position on the one hand and a relative motion between the first fluid port and the second fluid port on the other hand in motion directions that are orthogonal to each other.

13. The mounting device according to claim 1, comprising a second fluid port for fluidically connecting to a second fluid connection point of the sample separation unit, and further comprising at least one of the following features:
   - wherein the first fluid port and the second fluid port are configured to fluidically connect a horizontally oriented sample separation unit;
   - wherein the first fluid port and the second fluid port are configured to fluidically connect a vertically oriented sample separation unit.

14. The mounting device according to claim 1, wherein the actuation unit and/or the fluid coupling mechanism is or are configured to output a feedback; when the transferring is completed.

15. A sample separation device for separating a fluidic sample in a mobile phase, the sample separation device comprising:
   - a fluid conveying unit for conveying the mobile phase and the fluidic sample;
   - a sample separation unit for separating the fluidic sample in the mobile phase; and the mounting device according to claim 1, by which the sample separation unit is fluidically mounted in the sample separation device.

16. The sample separation device according to claim 15, further comprising at least one of the following features:
the sample separation unit is configured as a chromatographic separation unit;
the sample separation unit is configured as a chromatographic separation column;
the sample separation device is configured for analyzing at least one physical, chemical and/or biological parameter of at least one fraction of the fluidic sample;
the sample separation device comprises at least one of: a device for a chemical, biological and/or pharmaceutical analysis; a liquid chromatography device; a gas chromatography device; and a HPLC-device;
the fluid conveying unit is configured for driving the mobile phase with a high pressure according to one of: at least 100 bar; at least 500 bar; at least 1000 bar;
the sample separation device is configured as a microfluidic device;
the sample separation device is configured as a nanofluidic device;
the sample separation device comprises a detector for detecting the separated sample;
the sample separation device comprises an injector for injecting the fluidic sample in the mobile phase;
the sample separation device comprises a sample fractionator for fractionizing the separated sample.

17. A mounting device for mounting a sample separation unit for separating a fluidic sample in a sample separation device, the mounting device comprising:
a first fluid port for fluidically connecting to a first fluid connection point of the sample separation unit;
a second fluid port for fluidically connecting to a second fluid connection point of the sample separation unit;
an actuation unit actuatable by a user for transferring between an access position that renders the sample separation unit accessible for the user, and a fluid coupling position that fluidically couples the sample separation unit, wherein the actuation unit comprises a drawer; and
a fluid coupling mechanism configured, by a motion of the drawer, to form a force-loaded fluidic coupling between the first fluid port and the first fluid connection point and/or between the second fluid port and the second fluid connection point, when the sample separation unit is transferred into the fluid coupling position by the actuation unit,
the drawer is configured to increase a distance between the first fluid port and the second fluid port when transferring from the fluid coupling position into the access position.

18. A mounting device for mounting a sample separation unit for separating a fluidic sample in a sample separation device, the mounting device comprising:
a housing comprising an interior;
a first fluid port for fluidically connecting to a first fluid connection point of the sample separation unit;
an actuation unit actuatable by a user for transferring between an access position that renders the sample separation unit accessible for the user, and a fluid coupling position in the interior that fluidically couples the sample separation unit and renders the sample separation unit inaccessible by the user; and
a fluid coupling mechanism configured to form a force-loaded fluidic coupling between the first fluid port and the first fluid connection point, when the sample separation unit is transferred into the fluid coupling position by the actuation unit.

* * * * *